Oct. 18, 1960

S. E. GLUCK 2,957,166

SIGNAL PULSE CONVERTER

Filed Dec. 28, 1956

INVENTOR.
SIMON E. GLUCK

BY George Baron

ATTORNEY 2,957,166

SIGNAL PULSE CONVERTER

Simon E. Gluck, Malvern, Pa., assignor to Burroughs Corporation, Detroit, Mich., a corporation of Michigan Filed Dec. 28, 1956, Ser. No. 631,209

5 Claims. (Cl. 340—174)

Figure 1:
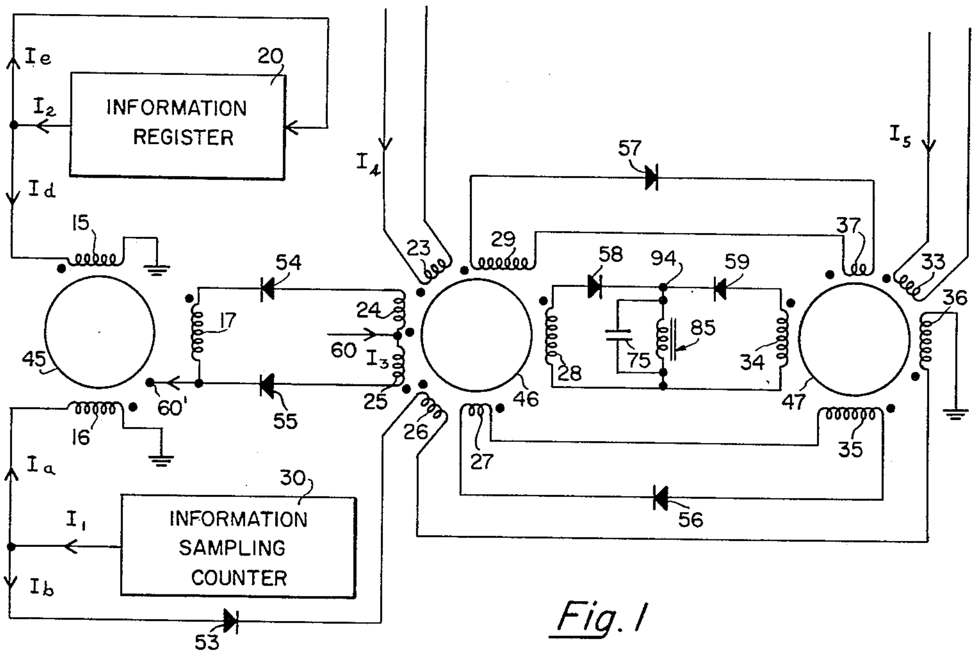

This invention relates to magnetic core switching devices and more particularly to a novel circuit for converting the output signal pulses of such devices to a substantially unidirectional current suitable for actuating relays and the like.

Bistable magnetic storage elements of the type used in electronic data handling systems are particularly valuable because of their miniature size, low power requirements, dependability, and ability to retain stored information in the form of static residual magnetism after being even momentarily magnetized to saturation in either of two directions. The magnetic storage element possessing a substantially rectangular hysteresis loop characteristic may be saturated by passing a current pulse through a winding on the element. The storage state of the magnetic element may be determined at any time by providing an interrogation saturation flux of a known polarity to windings coupled to said element. The interrogating flux source induces a large signal voltage pulse in transformer windings about the magnetic element when the remanence condition of such core is changed from one polarity to another. However when the interrogating flux leaves the core in the same remanent condition very little output signal is induced in such transformer windings about the core. Thus, the storage state is compared with the known polarity of the interrogation flux.

The time consumed in changing the remanence condition of a bistable magnetic element from one polarity to another is generally of the order of several microseconds. Frequently it is desirable to utilize the output voltage pulse of the magnetic storage element being interrogated to actuate a relay or similar slow switching device. For example, consider a data processing system in which the circuit logic has been so arranged that an output from a particular bistable magnetic element is indicative of the malfunctioning of the machine. In this case it is necessary that some visual or aural indication be given in order that appropriate action may be taken. Such indication might be the result of the closing of an electrical circuit by a solenoid actuable relay. Since the speed of switching of a magnetic core is of the order of microseconds and the speed of switching of a relay is of the order of milliseconds, some means of pulse conversion is necessary.

This invention relates to a particular circuit utilizing bistable magnetic elements which converts the short duration output pulse resulting from the switching of a magnetic core to a suitable unidirectional voltage suitable for actuating a relay or other slow switching device.

In accordance with the instant invention the output switching voltage of a magnetic core is transferred into a magnetic core circuit that provides non-destructive read-out; the pulse output of this latter circuit being filtered to provide the direct current required to actuate a relay.

In addition to its use in an error detecting system as hereinbefore described, the instant invention has other applications. One such application is the conversion of stored binary information to signal levels capable of actuating teletypewriter communication equipment. For example, the information to be transmitted may be stored in binary magnetic cores arranged in the form of a shift register. At predetermined intervals the information in the register is sampled and the presence of either a binary "1" or "0" is sensed by the magnetic core circuit of the instant invention and is converted to a voltage level suitable for actuating the relay of a teletypewriter transmitter.

It it therefore an object of the present invention to provide improved magnetic core circuits for use in electronic data processing and communication systems.

A more specific object of this invention is to increase the utility of magnetic core circuits by providing the means whereby high speed magnetic circuits can be used in combination with slower speed devices.

Another object of this invention is to provide a means of converting the short duration switching pulse output of a magnetic core to a continuous direct current level.

A further object of the instant invention is to provide a means of converting a signal pulse whose duration is of the order of microseconds to an output pulse of any desired duration.

Figure 2:
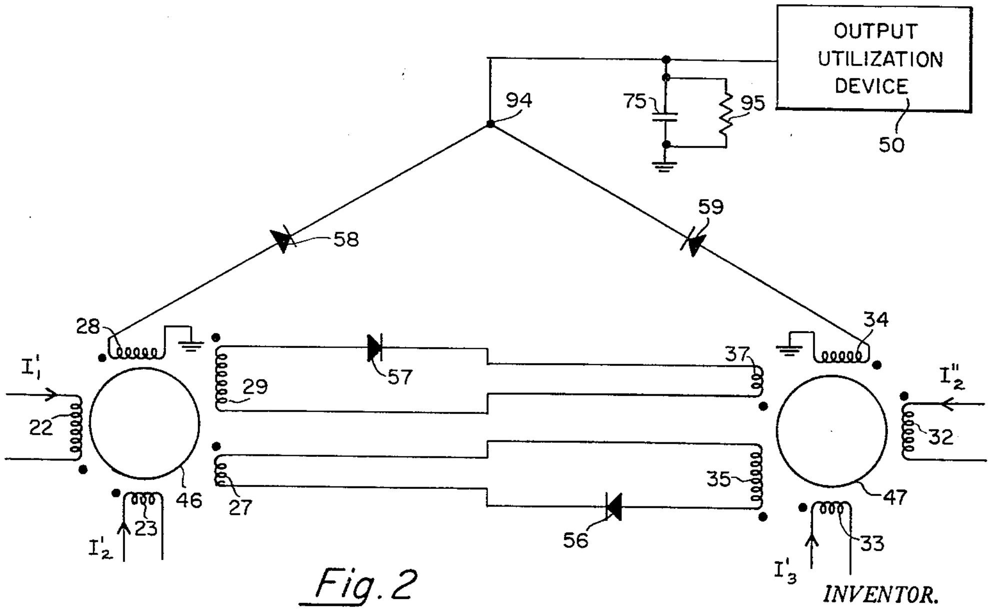

Other features and objects of the invention will be described throughout the following detailed description of the invention and illustrated in the accompanying drawings, in which:

Fig. 1 is a schematic diagram illustrating an embodiment of the instant invention in a teletypewriter communication system; and Fig. 2 is a schematic illustration of a circuit for converting short duration pulses to a direct current of substantially constant amplitude.

Before proceeding with a detailed analysis of the circuit, it will be helpful to review the notation and background material used in connection with the schematic diagram. Information of opposite polarities to be stored in binary elements is arbitrarily designated in the binary notation "1" and "0." Magnetic binary elements are shown as circles and it is assumed that these circles represent magnetic cores having essentially rectangular hysteresis loop characteristics. Although the magnetic elements are depicted herein as being toroidal in form, it is understood that the invention is not limited to elements of this particular geometry, but may include other forms of magnetic storage elements.

Each of the magnetic cores is supplied with windings for producing a magnetic flux therein in response to current flow through these windings. A dot is placed at the end of each of these windings to indicate that that end has a negative polarity during read-in of a binary "1" and a positive polarity during read-out of a binary "1." Thus as current flows into the dotted winding terminal, the core associated with such winding will tend to store a "0." Conversely, if the current flows into an undotted winding terminal, the core associated with such winding will tend to store a "1."

The signals, storage conditions and currents are designated by appropriate letters supplied with subscript numbers which designate a relative time step. A definite sequence of time steps occurs during each sequential time period. For example, time steps denoted by the subscripts 1, 2, 3, etc. respectively, make up one sequential time period. Thus current $I_1$ indicates current flow in the first step of a sequential time period.

Referring now to Fig. 1, consider the operation of a system utilizing the instant invention. The information to be transmitted is stored in an information register 20. In general the information register may conveniently utilize magnetic core circuits in a ring-counter configuration, i.e. a configuration in which the output of the register is fed back to the input of the register and in which the information is allowed to circulate at a predetermined rate. The function of the information sampling counter 30 is to examine the magnetic remanent state of each of the stages in the information register 20. This is accomplished in the following manner. The information sampling counter 30 is conveniently a magnetic ring-counter in which a single "1" is being circulated. In order that each of the bits of information may be sampled successively, the sampling counter must be designated with $(An+1)$ stages where $n$ is the number of stages or bits in the information register 20 and A is an integer whose value will determine the rate at which the counter 30 will sample information from the register.

The output signals generated by the information register 20 and the sampling counter 30 are coupled to a magnetic element 45 by means of input windings 15 and 16 respectively. An output signal from bistable magnetic element 45 appearing across transfer winding 17 is further coupled to a second bistable magnetic element 46 by means of a transfer loop circuit comprising transfer winding 17, signal windings 24 and 25 and diodes 54 and 55. Associated with magnetic element 46 are two output windings 28 and 29, an interrogation winding 23, input winding 27 and a reset winding 26. The information stored in element 46 can be transferred to a third bistable magnetic element 47 by means of a transfer loop circuit comprising winding 29, diode 57 and winding 37. The information stored in bistable element 46, when switched from one stable to its other, produces an output voltage pulse that appears across winding 28 and is coupled to an output terminal 94 via a diode 58.

Magnetic element 47 has associated with it two output windings 34 and 35, interrogation winding 33, input winding 37 and a reset winding 36. The information stored in element 47 is shifted back to element 46 by means of a transfer loop comprising output winding 35, diode 56 and input winding 27. The information output pulse arising when element 47 switches also appears across winding 34 and is coupled to the common output point 94 via a diode 59. Magnetic cores 46 and 47 and their associated windings comprise a one-bit re-entrant shift register called a "ping-pong" circuit. Such a circuit providing non-destructive dynamic storage is described by W. Miehle in copending application Serial No. 791,002, filed January 30, 1959, which is a continuation of application Serial No. 407,120 filed January 29, 1954, now abandoned; said copending application having been assigned to the assignee of the instant application.

Thus the information corresponding to the original binary signal stored in magnetic element 45 is shifted back and forth between magnetic elements 46 and 47 thereby producing two trains of output pulses of different phase relationship in accordance with the successive switching of magnetic elements 46 and 47. Such trains of output pulses are interlaced by virtue of their common connection to terminal 94 and the resultant interlaced pulse train is converted to a substantially D.-C. potential by suitable filtering means. Capacitor 75 in conjunction with the inductance of relay coil 85 provides such filtering in the specific embodiment of Fig. 1.

The operation of Fig. 1 will now be described. At time $t_1$ an output current pulse $I_1$ from the sampling counter 30 causes current $I_a$ to flow through winding 16 associated with magnetic core 45, entering such winding at its undotted terminal. Assuming that core 45 was in the "0" state as a result of a preceding cycle of operation, the current pulse from the sampling counter switches core 45 to the "1" state. Current pulse $I_1$ also branches off into current $I_b$ which flows through windings 26 and 36 in such a direction as to reset magnetic elements 46 and 47 to their respective "0" states. At time $t_2$, the information in the last output core of ring counter or shift register 20 is read out. The read out of a binary "1" from such last output core results in the flow of current $I_2$ which divides into branch currents $I_e$ and $I_d$. Current $I_e$ reads a "1" back into the input core of the register in order that it can be re-circulated. Current $I_d$ flows into winding 15 associated with magnetic core 45 entering such winding through its dotted terminal and tends to switch the core to the "0" state, thereby destroying the binary "1" which had been stored in core 45 by the information sampling counter at time $t_1$. At time $t_3$, interrogation current $I_3$ which enters the transfer loop coupling cores 45 and 46 at input terminal 60 finds magnetic core 45 in the "0" state so that the latter does not switch; core 46 remains in the "0" magnetic remanent state, unaffected by core 45.

In the cycle of operation presently under consideration, both magnetic cores 46 and 47 comprising the "ping-pong" circuit are in their respective "0" states and there is no switching voltage developed across either output winding 28 or 34 when advance or interrogating currents $I_4$ and $I_5$ are applied to windings 23 and 33, respectively. Hence no voltage is applied to relay coil 85 when each of cores 46 and 47 is respectively in its "0" remanent state.

The assumption was made in the preceding description of the circuit operation that the counter 30 sampled a binary "1" from the information register 20. The circuit operation differs somewhat when the information sampled is a "0." At time $t_1$ an output current pulse $I_1$ from the sampling counter 30 again causes current $I_a$ to flow through winding 16 thereby setting core 45 to the "1" magnetic remanent state. At time $t_2$ the output magnetic core of the information register 20 is interrogated by an advance current pulse which tends to drive the core to the "0" remanent state. If the information stored in the core of the information register 20 at this time is a "0," only a small noise voltage will be developed in the output winding and current $I_2$ (and also $I_d$ and $I_e$) will be negligibly small. Consequently magnetic core 45 remains in the "1" state and a "0" is read back into the input core of the register for recirculation. At time $t_3$, current pulse $I_3$ flows from its supply (not shown) into terminal 60 and thence through the two parallel paths of the split winding transfer loop back to its source via output terminal 60'. Since magnetic core 45 is in the "1" state, the current flowing through winding 24, diode 54 and winding 17 will be smaller than that flowing through winding 25 and diode 55 due to the counter E.M.F. developed across winding 17 of core 45 when the latter switches toward its "0" state. Consequently the M.M.F. applied to core 46 as a result of the larger current flowing through winding 25 is sufficient to switch core 46 to the "1" state. The diodes 54 and 55 prevent any significant current flow in the transfer circuit except at time $t_3$ regardless of the switching voltages induced in the windings associated with magnetic elements 45 and 46 during other time periods.

In the succeeding time step advance current $I_4$ flows through winding 23 thereby switching core 46 toward the "0" state and inducing voltage pulses across output windings 28 and 29 and input winding 27. The voltage induced across winding 29 causes current to flow in a first transfer loop comprising diode 57, winding 37 and winding 29. The M.M.F. applied to core 47 as a result of such induced current flow switches core 47 to the "1" state. The voltage induced across output winding 28 causes current to flow through diode 58, capacitor 75 in parallel with relay coil 85 and back to winding 28. The comparatively small voltage induced across winding 27 is also of the proper polarity to store a "1" in core 47 by producing current flow through winding 35, but this current is negligible because of the high impedance in the circuit which exists because of the large number of turns of winding 35 as compared to winding 27, and does not alter the proper operation of the circuit herein described. When magnetic core 46 is switched toward the "0" state, voltages are also induced in windings 24, 25 and 26 but the current flow in the circuits associated with these windings is negligible due to the blocking effects of diodes 54 and 53.

In like manner when core 47 is switched toward the "0" state by current $I_5$ flowing through winding 33, voltages are induced in windings 35, 34, 37 and 36. The voltage induced in winding 35 causes current to flow in a second transfer loop comprising diode 56, input winding 27 and output winding 35, causing magnetic core 46 to switch to the "1" state. The voltage induced across output winding 34 due to core 47 switching to its "1" state current flow through winding 34, diode 59, capacitor 75 in parallel with relay coil 85, and back to winding 34. As was discussed in connection with winding 27, the voltage induced across winding 37 produces only negligible current flow in said first transfer loop because winding 29 has a greater number of turns than winding 37. Such negligible current has no effect in switching core 46. Current flow in the circuit associated with winding 36 is also negligible due to the action of blocking diode 53. As hereinbefore indicated, the output voltage pulses resulting from the switching of magnetic elements 46 and 47 from their "1" states to their respective "0" states are interlaced by virtue of their common connection at terminal 94 where they are applied to capacitor 75 and the relay coil 85. The function of capacitor 75 is to absorb energy during each of the switching pulses and deliver this energy to the relay coil 85 between pulses, thereby producing a D.-C. voltage with a small alternating or ripple voltage. This ripple voltage is even further reduced by the inductance of the relay coil which tends to prevent changes in the magnitude of the current. Therefore the voltage output of magnetic elements 46 and 47 as it appears across the relay coil 85 is nearly constant in amplitude.

Although the system utilizes the sequence of time steps heerinbefore described, it should be noted that all the events do not have the same repetition rate. That is, the pulse repetition frequency of currents $I_4$ and $I_5$ which transfer information back and forth in the "ping-pong" is preferably several times that of $I_1$, $I_2$ and $I_3$ in order that the output ripple voltage appearing across relay coil 85 be kept to a minimum. Further the information sampling counter may be designed to sample information from the register at time intervals encompassing several cycles of circulated information. This enables the output relay to operate at a much slower rate.

The voltage applied to the relay coil 85 may either open or close the relay contacts associated with such relay depending upon its internal construction. Since in the system described, the sampling of a binary "1" from the information register results in no actuating voltage for the relay and the sampling of a "0" results in a D.C. voltage applied to the relay, it might be advantageous to select a relay whose contacts are normally closed when no voltage is applied thereto and open when an actuating voltage is applied thereto. As applied to a teletypewriter system, this would mean that the transmission of a pulse of current, referred to as a "mark," would be representative of a binary "1" in the information register 20 and the absence of current, termed a "space," would be indicative of a "0" in the information storage register.

Fig. 2 depicts the instant invention in a form suitable for use in a variety of applications where it is desirable to convert short duration pulses to a continuous direct current level. Input current pulse $I'_1$, flowing through signal winding 22 will read a "1" into magnetic core 46. Such input pulse may be of the order of several microseconds duration and may be the result of the switching of a magnetic core, or the output of a blocking oscillator, or a trigger voltage from numerous other sources. Current $I'_2$ and $I'_3$ correspond to currents $I_4$ and $I_5$ of Fig. 1 and shift the information back and forth in the "ping-pong" comprising magnetic cores 46 and 47.

Current $I''_2$ is a conditional pulse applied to inhibit winding 32 of core 47 at the same time that $I'_2$ is applied to winding 23 of core 46 whenever it is desired to destroy the information circulating in the "ping-pong." Such simultaneous resetting of cores 46 and 47 to their respective "0" states prevents the further production of voltage pulses in windings 28 and 34. Thus the M.M.F. applied to core 47 by current $I''_2$ flowing through winding 32 is sufficient to keep core 47 in the "0" state despite the presence of the transfer current flowing through winding 37, entering the latter at its undotted terminal as a result of the switching of core 46 from the "1" state to the "0" state by current $I'_2$.

As hereinbefore explained in connection with Fig. 1, the switching of either core 46 or 47 from its respective "1" state to the "0" state produces an output voltage across either winding 28 or 34. These voltage pulse outputs are interlaced at junction 94 and are applied to capacitor 75 and resistor 95 which filter the pulses and produce an essentially D.-C. voltage for application to the output utilization device 50. Such output devices may include relays, neon indicator lamps, and the like.

From the foregoing description of the invention and its mode of operation, it is evident that there is provided a novel magnetic circuit for converting a signal pulse of only a few microseconds duration to a D.-C. voltage level which may be maintained for any desired duration. Such duration of the output voltage level is dependent upon a predetermined number of cycles of "ping-pong" circuit operation during which a single binary "1" is shifted back and forth between the two magnetic cores comprising the "ping-pong." Those features of novelty believed descriptive of the nature of the invention are therefore described with particularity in the appended claims.

What is claimed is:

1. A magnetic circuit comprising in combination a first and second magnetic element each capable of assuming bistable states of magnetic remanence; a signal winding coupled to said first element and adapted to be pulsed from a source of binary signals whereby said first element assumes one remanent state or the other according to the signal applied; an input winding, an interrogation winding, and a plurality of output windings coupled to each of said magnetic elements; a first transfer circuit comprising in series a first of said output windings on said first magnetic element, a first unidirectional current device, and said input winding on said second magnetic element; a second transfer circuit comprising in series a first of said output windings on said second magnetic element, a second unidirectional current device, and said input winding on said first magnetic element; said interrogation windings being pulsed unconditionally and alternately from a source of interrogation current whereby if said first element is in one but not the other of its two states at the time its interrogation winding is pulsed, said first element is switched and a signal is induced in its said first output winding which is transferred to said second element via said first transfer circuit, said second element subsequently being switched in response to the interrogation pulse applied to its interrogation winding whereby a signal is induced in its said first output winding and transferred back to the first element via said second transfer circuit, said back and forth transfer thereupon being cyclically repeated in response to the application of alternate interrogation pulses, the alternate repeated switching of said first and second elements causing the generation of output pulses in the second of said output windings coupled respectively to each of said first and second elements; filter means for converting pulsating current to a direct current of substantially constant amplitude; and unidirectional current conducting means coupling said output pulses to said filter means for providing a direct-current output voltage level indicating whether one or the other binary signal was applied to said first magnetic element.

2. A pulse converter comprising in combination a first and second magnetic element each capable of assuming bistable states of magnetic remanence representative of the binary "1" and "0," a signal winding coupled to said first element and adapted to be pulsed from a source of signal pulses, said first magnetic element being switched to the "1" state in response to one of said signal pulses but remaining in the "0" state in the absence of said pulses; an input winding, an interrogation winding, and at least two output windings coupled to each of said first and second elements; a first transfer circuit comprising in series a first of said output windings on said first magnetic element, a first unidirectional current device, and said input winding on said second magnetic element; a second transfer circuit comprising in series a first of said output windings on said second magnetic element, a second unidirectional current device, and said input winding on said first magnetic element; said interrogation windings being adapted to be pulsed unconditionally and alternately from a source of interrogation current whereby if said first magnetic element has been switched to the "1" state by one of said signal pulses, said interrogation current switching said first element from the "1" state to the "0" state and thereby effecting the transfer of a "1" to said second magnetic element by way of said first transfer circuit; said second element subsequently being switched from the "1" state to the "0" state in response to the interrogation pulse applied to its interrogation winding thereby effecting the transfer of a "1" back to said first element by way of said second transfer circuit; the alternate switching of said magnetic elements from the "1" state to the "0" state by said interrogation current resulting in the generation of a first and second train of output pulses across the second of said output windings coupled respectively to each of said magnetic elements; means connecting said second output windings to a common point for interlacing said first and second trains of pulses; and means for converting said interlaced pulse train to a substantially direct-current potential indicative of the signal pulse applied to said first magnetic element.

3. A magnetic circuit as described in claim 2 for converting a short duration signal pulse to a direct-current potential and characterized by means for controlling the duration of said potential comprising an inhibit winding coupled to said second magnetic element and adapted to be pulsed conditionally from a current source, said inhibit winding being pulsed concurrently with the pulsing of said interrogation winding coupled to said first magnetic element, the magnetomotive force applied to said second magnetic element by current flow through said inhibit winding overcoming the magnetomotive force applied to said second element by the switching of said first element and preventing the switching of said second magnetic element, thereby precluding the subsequent switching of either said first or second magnetic elements and terminating said direct-current potential.

4. In a teletypewriter communication system, the combination of a magnetic shift register for storing and circulating information in the form of binary "1's" and "0's," means for successively sampling each bit of information stored in said shift register; an input magnetic storage element having two stable states of magnetic remanence and coupled to said sampling means for storing each of said sampled bits of information, a sensing winding and a transfer winding coupled to said input element, a ping-pong circuit comprising a first and second magnetic element each capable of assuming bistable states of magnetic remanence; an input winding, an interrogation winding, and a plurality of output windings coupled to each of said first and second elements; means coupling said signal winding on said first element to said transfer winding on said input element, switching means coupled to said sensing winding for reading out the information stored in said input element; said first magnetic element being switched to the "1" state in response to the switching of said input magnetic element but remaining in the "0" state in the absence of such switching; a first transfer circuit comprising in series a first of said output windings on said first magnetic element, a first unidirectional current device, and said input winding on said second magnetic element; a second transfer circuit comprising in series a first of said output windings on said second magnetic element, a second unidirectional current device, and said input winding on said first magnetic element; said interrogation windings being adapted to be pulsed unconditionally and alternately from a source of interrogation current whereby if said first magnetic element has been switched to the "1" state in response to the switching of said input element, said interrogation current switching said first element from the "1" state to the "0" state and thereby effecting the transfer of a "1" to said second magnetic element by way of said first transfer circuit; said second element subsequently being switched from the "1" state to the "0" state in response to the interrogation pulse applied to its interrogation winding, thereby effecting the transfer of a "1" back to said first element by way of said second transfer circuit; the alternate switching of said first and second magnetic elements from the "1" state to the "0" state by said interrogation current resulting in the generation of a first and second train of output pulses across a second of said output windings coupled respectively to each of said first and second magnetic elements; means connecting said second output windings to a common terminal for interlacing said first and second trains of pulses; means for converting said interlaced pulse train to a substantially direct-current potential indicative of the signal stored in said input magnetic element, and means for applying said direct-current potential to a solenoid actuable relay having an actuating winding thereon.

5. The system of claim 4 wherein said means for converting said interlaced pulse train to a substantially direct-current potential comprises a capacitor in parallel with the actuating winding of said relay.

References Cited in the file of this patent

UNITED STATES PATENTS

| | | |
|---|---|---|
| 2,529,547 | Fisher | Nov. 14, 1950 |
| 2,709,770 | Hansen | May 31, 1955 |
| 2,785,390 | Rajchman | Mar. 12, 1957 |
| 2,802,953 | Arsenault et al. | Aug. 13, 1957 |